(12) United States Patent
Wiley et al.

(10) Patent No.: US 10,683,945 B2
(45) Date of Patent: Jun. 16, 2020

(54) COMPRESSED NATURAL GAS (CNG) PRESSURE REGULATOR

(71) Applicant: ITT MANUFACTURING ENTERPRISES LLC, Wilmington, DE (US)

(72) Inventors: Darrell T. Wiley, Walhalla, SC (US); Jeffrey B. Gotthelf, Fair Play, SC (US); Christopher Tucker, Atlanta, GA (US)

(73) Assignee: ITT Manufacturing Enterprises LLC, Wilmington, DE (US)

( * ) Notice: Subject to any disclaimer, the term of this patent is extended or adjusted under 35 U.S.C. 154(b) by 0 days.

(21) Appl. No.: 16/220,274

(22) Filed: Dec. 14, 2018

(65) Prior Publication Data

US 2019/0120393 A1 Apr. 25, 2019

Related U.S. Application Data

(63) Continuation of application No. 15/292,254, filed on Oct. 13, 2016, now Pat. No. 10,174,853.

(51) Int. Cl.
*F16K 17/04* (2006.01)
*F02M 21/02* (2006.01)
(Continued)

(52) U.S. Cl.
CPC .......... *F16K 17/04* (2013.01); *F02M 21/0239* (2013.01); *G05D 7/0133* (2013.01);
(Continued)

(58) Field of Classification Search
CPC ............ F02M 21/0239; F02M 21/021; G05D 7/0133; G05D 16/103; F16K 17/00;
(Continued)

(56) References Cited

U.S. PATENT DOCUMENTS 2,690,760 A 10/1954 Hughes
3,245,221 A 4/1966 James et al.
(Continued)

FOREIGN PATENT DOCUMENTS

EP 0 545 121 B1 1/1997
EP 1 849 988 A2 10/2007
(Continued)

OTHER PUBLICATIONS

Hydra Cool Water Cooling Method; Kurt J. Lesker Company; https://www.lesker.com/newweb/manufacturing/hydracool.cfm; © 1996-2018; 2 pages.
(Continued)

*Primary Examiner* — P. Macade Nichols
(74) *Attorney, Agent, or Firm* — Barclay Damon LLP (57) ABSTRACT

A flow regulator for a compressed natural gas (CNG) system is defined by a housing having at least one inlet port, at least one outlet port and at least one interior passage fluidically interconnecting the inlet and outlet ports. A mechanical bypass valve is disposed between the inlet and outlet ports and enabled by a movable biased feature which moves based on inlet pressure and in which the bypass valve is closed only after inlet pressure is greater than a predetermined threshold. The bypass valve is a fail safe wherein gas regulation does not occur until the inlet pressure is sufficient to close the bypass valve. The flow regulator further includes a coolant bowl defined by a serpentine channel formed in a coolant plate as well as a balanced valve as a regulator control feature in conjunction with a weighting or loading mechanism having a diaphragm.

13 Claims, 8 Drawing Sheets

(51) Int. Cl.
*G05D 7/01* (2006.01)
*G05D 16/10* (2006.01)

(52) U.S. Cl.
CPC ....... *G05D 16/103* (2013.01); *F02M 21/0215* (2013.01); *F17C 2205/0323* (2013.01); *F17C 2205/0338* (2013.01); *Y02T 10/32* (2013.01)

(58) Field of Classification Search
CPC .............. F16K 17/04; F17C 2205/0323; F17C 2205/0338; Y02T 10/32
See application file for complete search history.

(56) References Cited

U.S. PATENT DOCUMENTS

| | | | |
|---|---|---|---|
| 3,659,902 A | 5/1972 | Kish et al. | |
| 3,749,122 A | 7/1973 | Gold | F16K 15/063 |
| | | | 137/515.7 |
| 4,727,903 A | 3/1988 | Sturgis et al. | |
| 4,760,866 A | 8/1988 | Adler | |
| 5,135,023 A | 8/1992 | Ross | F17C 13/025 |
| | | | 137/505.11 |
| 5,597,012 A | 1/1997 | Moinard | |
| 7,309,113 B2 | 12/2007 | Carter | |
| 7,617,841 B2 | 11/2009 | Zimpfer et al. | |
| 7,828,009 B2 | 11/2010 | Neumann et al. | |
| 8,205,638 B2 | 6/2012 | Einav et al. | |
| 8,240,522 B2 | 8/2012 | Newton et al. | |
| 8,701,458 B2 | 4/2014 | Emtell et al. | |
| 2002/0014277 A1 | 2/2002 | Togasawa et al. | |
| 2003/0106538 A1* | 6/2003 | Benson | F02B 43/00 |
| | | | 123/527 |
| 2013/0205745 A1 | 8/2013 | Detry et al. | |
| 2016/0091102 A1 | 3/2016 | Neubauer et al. | |

FOREIGN PATENT DOCUMENTS

| | | |
|---|---|---|
| EP | 1 849 988 A3 | 10/2007 |
| EP | 1 849 988 A8 | 10/2007 |
| FR | 2 775 048 | 8/1999 |
| GB | 1 536 959 | 12/1978 |
| JP | 61-185667 | 8/1986 |
| WO | WO 99/42750 | 8/1999 |

OTHER PUBLICATIONS

Selection criteria for shutoff valves (Abstract); Nitsche; M. Hinze, Three R Int 23. 11 (Nov. 1, 1984): 508-512 (2 pgs).

Development of CNG multi-point injection system for the new model AD VAN (Abstract): Hosol, Nissan Giho (Nissan Technical Review) 46 (Jan. 1, 2000); 67-69 (2 pgs).

Optimize Your Deliveries of Industrial Gases; Sauer, John; Scheuring, Steve; Chemical Engineering 112 10 (Oct. 2005); 52-59 (7 pgs).

International Search Report and Written Opinion for PCT/US2017/051996, dated Mar. 21, 2018; 10 pages.

Korean Office Action for KR 10-2019-7012571; dated Jul. 16, 2019; 6 pages.

Japanese Office Action for JP 2019-520151; dated Sep. 10, 2019; 5 pages.

\* cited by examiner

COMPRESSED NATURAL GAS (CNG) PRESSURE REGULATOR

CROSS REFERENCE TO RELATED APPLICATION

This application is a continuation application of U.S. Ser. No. 15/292,254, filed on Oct. 13, 2016, the entire contents of which are incorporated by reference.

TECHNICAL FIELD

This application generally relates to the field of compressed natural gas (CNG) systems, and more specifically to a flow regulator for a compressed natural gas system having a mechanical bypass valve that enables a regulated mode and a bypass mode of operation, as well as additional attendant features including a coolant bowl and a balance valve.

BACKGROUND

Pressure or flow regulators are commonly known for purposes of taking a high pressure fluid source and reducing the pressure for porting of same. In a typical flow regulator, a fluid source inputted under high pressure (e.g., 3600 psi) is ported to a significantly lower pressure (e.g., 70-150 psi). A number of different and varied applications utilize compressed natural gas (CNG). These applications include the automotive industry in which CNG flow regulator systems have been employed for motorized vehicles and the like. A number of these systems require complex and elaborate electrical relay systems that can fail, thereby rendering the system inoperative.

As a result, there is a need in the field to provide a pressure regulator or similar device that includes a mechanical bypass valve to permit or otherwise enable pressure controlled operational modes, including a standard regulated mode and a bypass mode, as needed, based on inlet and outlet pressures but without compromising the operability and performance of the regulator.

Additionally, there are ongoing and general needs in the field to improve the overall functionality and performance of CNG flow regulators and more specifically to address issues in various field related applications, including vehicular based systems.

BRIEF DESCRIPTION

Therefore and according to a first aspect, there is provided a flow regulator for a compressed natural gas (CNG) system, the flow regulator comprising a housing having at least one inlet port, at least one outlet port, and at least one interior passage that fluidically interconnects the inlet and outlet ports. A mechanical bypass valve disposed within the at least one defined interior chamber enables a bypass mode of operation. When the inlet pressure reaches a predetermined threshold, the bypass valve is closed and the regulator works in its typical (i.e., regulated) mode of operation. When the inlet pressure is below the predetermined threshold, the bypass valve remains opened and the flow regulator operates in a bypass mode of operation in order to port the compressed gas directly to the outlet port.

According to at least one version, the bypass valve includes a movable sensing piston biased by a control spring. When the inlet pressure exceeds the predetermined threshold, the sensing piston is moved sufficiently to overcome the bias of the control spring and move to a position that closes the valve. When the valve is closed, the regulator is placed in the regulated mode of operation. While the valve is opened, the regulator is in a bypass mode of operation. As such, the bypass valve acts as a failsafe, requiring sufficient supply pressure to enable regulated mode operation.

In at least one version, the regulator can include at least one feature that permits adjustment of the control spring. Preferably, the at least one adjustment feature is user accessible. A valve plug is acted upon in one version by the movable piston. The valve plug is biased by a compression spring to facilitate opening of the valve when the inlet pressure threshold has been achieved. A filter can be optionally added to compressed natural gas which is routed to the outlet port in the bypass mode.

According to another aspect, there is provided a method for controlling the flow of compressed natural gas in a flow regulator. The method comprises the steps of connecting a mechanical bypass valve between the inlet and outlet posts of the regulator, the bypass valve having a sensing feature that is biasedly movable based on the inlet pressure. According to one version, a sensing piston is fluidically coupled to the inlet port of the regulator, the sensing piston being movable relative to a control spring such that when the inlet pressure reaches a predetermined threshold, the biasing force of the control spring is overcome. When the threshold is achieved, the bypass valve is closed thereby enabling the flow regulator to act in a regulated mode of operation. When the inlet pressure is below the predetermined threshold, the flow regulator is maintained in a bypass mode in which gas is directly routed from the inlet port to the outlet port without regulation. Preferably, the bypass valve is initially maintained in the open position to act as a failsafe.

According to at least one version, the pressure regulator can include a set of fins that are provided in a pattern that better effects cooling of the compressed natural gas moving during porting thereof. The pattern according to at least one embodiment is defined by a serpentine loop or circuit formed in a coolant plate that is fluidically connected between a set of coolant ports and defining a coolant bowl. Coolant fluid is passed continually through the defined serpentine circuit to effect convective heat transfer upon the regulated natural gas.

According to yet another aspect, the herein described flow regulator can include a balance valve that is configured to work with the weighting mechanism of the pressure regulator in order to adequately balance variations in supply pressure.

According to yet another version, there is provided a bypass valve for a pressure regulator, the pressure regulator having a housing including an inlet port, an outlet port and at least one interior passage interconnecting the inlet port and outlet port and in which the bypass valve is disposed between the inlet port and outlet port. According to one version, the bypass valve comprises a movable sensing piston that is biasedly connected to a control spring in which a predetermined inlet pressure is required to overcome the biasing force of the sensing piston to enable the valve to close and permit the regulator to assume a regulator mode of operation and in which the regulator otherwise is enabled in a bypass mode of operation in which CNG is ported directly from the inlet port to the outlet port.

The bypass valve can include, according to at least one version, at least one user accessible feature for selectively adjusting the tension of the control spring. The valve can also be defined by a valve plug or body connected to the sensing piston. In at least one version, the valve plug is biased by a compression spring. When the inlet pressure reaches the predetermined threshold, the valve plug is movable to close the valve as aided by the compression spring.

One advantage provided is that the design of the herein described bypass valve enables its overall use as an independent fluid control element. To that end, the bypass valve can be alternatively embodied, for example, within a manifold with a flow regulator or other suitable applications and uses.

Another advantage realized by the herein described flow regulator is that the bypass valve does not require electrical power for purposes of operation. That is, the bypass mode of operation is purely mechanical in nature and is not subject to electrical failures.

The herein described bypass valve is entirely self-contained and does not require external power for purposes of its operation. Furthermore, the bypass valve is preferably configured with a self-closing fail-safe mode if fatigue, corrosion or other effects were to accelerate spring failure of the bypass assembly. Still further, the valve is not sufficiently complex and is cheaper in terms of costs than expensive electrical relay systems.

Yet another advantage realized by the present invention is that the finned coolant bowl creates a tortuous coolant path which is disposed about a central location. Functionally, the design of this coolant bowl effectively removes the potential for heavy hydrocarbons condensing by means of thermal expansion.

Yet another advantage realized is the inclusion of a balance valve for use in a CNG flow regulator to stabilize variations in supply pressure.

These and other features and advantages will be readily apparent from the following Detailed Description, which should be read in conjunction with the accompanying drawings.

DETAILED DESCRIPTION

The following relates to a single embodiment of a flow regulator for use in connection with a compressed natural gas (CNG) system, such as those found in motorized vehicles. As discussed herein, the flow regulator includes a number of resident features, including a mechanical bypass valve assembly, among others. It will be understood that the specific applications for the herein described flow regulator can be suitably varied. In addition, certain terms are used throughout in order to provide a suitable frame of reference in regard to the accompanying drawings. These terms, which include "inner", "outer", "interior", "exterior", "above", "below", "top" and "bottom", among others, are not intended to narrow the overall scope of the herein described flow regulator, including the claims, except where so specifically indicated.

For purposes of this discussion, the terms "distal" and "proximal" refer to the side or end closest to the interior of the regulator and the side or end closest to the user, respectively.

As used herein, the terms "a", "one", and "the" as used herein are intended to refer to a single quantity of a feature or item. However, these terms can also refer to the presence of "at least one" (i.e., a plurality) of a feature or item.

Figure 1:
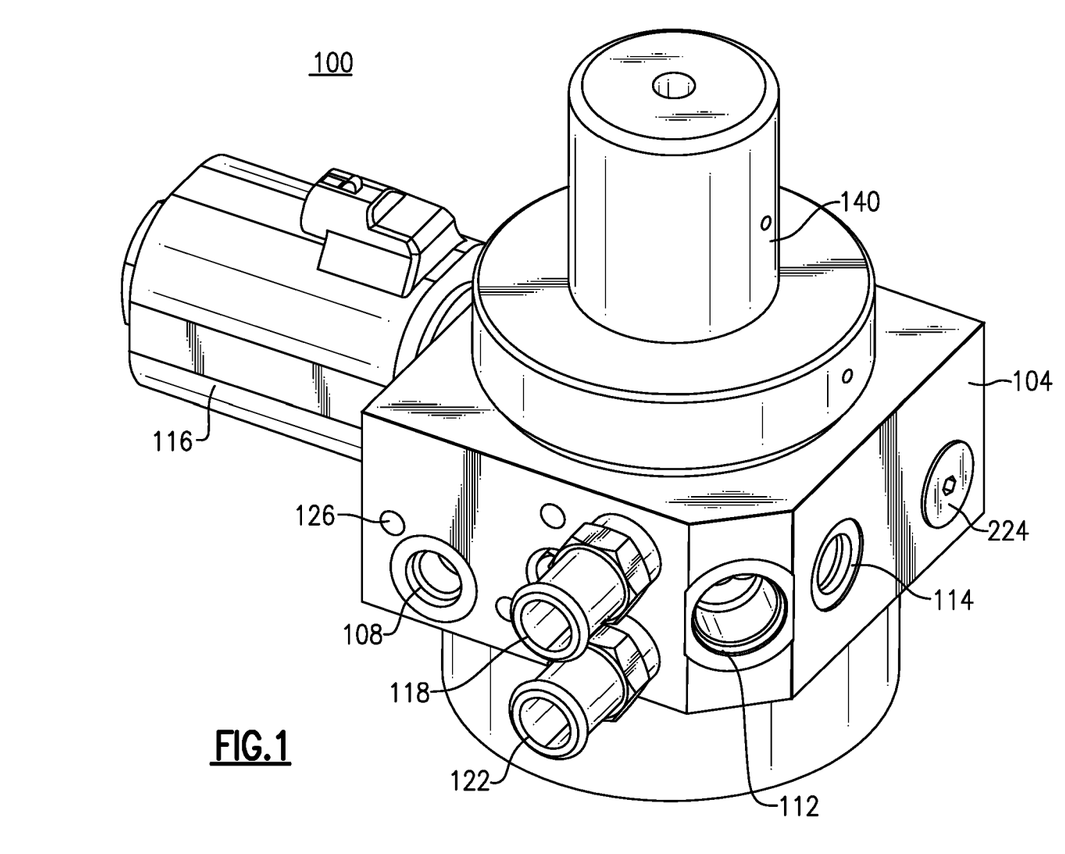
FIG. 1 is a side perspective view of a flow regulator in accordance with an embodiment.

Referring to FIG. 1, there is shown a flow regulator 100 made in accordance with the herein described embodiment. The flow regulator 100 is defined by a housing 104 made from a suitable structural material. The regulator housing 104 is defined by a top surface, a plurality of side or lateral walls, and a bottom surface including a bottom extending portion. More specifically and according to this embodiment, the regulator housing 104 is defined by a substantially rectangular configuration with regard to the lateral walls with the exception of an angled surface between two of the side walls at one corner thereof. It will be readily apparent from the following discussion that this design provides a number of packaging advantages. However, the specific design of the regulator housing 104 (shape, geometry) can be suitably varied.

The housing 104 supports a plurality of connections/ports, including an inlet port 108 and at least one outlet port 112, each of the ports 108, 112 extending into the interior of the flow regulator 100. In addition and according to this embodiment, a pair of cooling ports 118, 122 are further provided adjacent the inlet port 108 along one side wall of the housing 104. As further discussed herein, the cooling ports 118, 122 are commonly connected to a source of fluid (not shown) by means of a cooling circuit disposed in the regulator 100.

According to this specific embodiment, the inlet port 108 is disposed on the same side wall as the cooling ports 118, 122, the latter of which are disposed in a parallel and stacked configuration. The outlet port 112 is disposed on the angled side wall with an adjacent port 114 being provided for an outlet pressure sensor.

Figure 4:
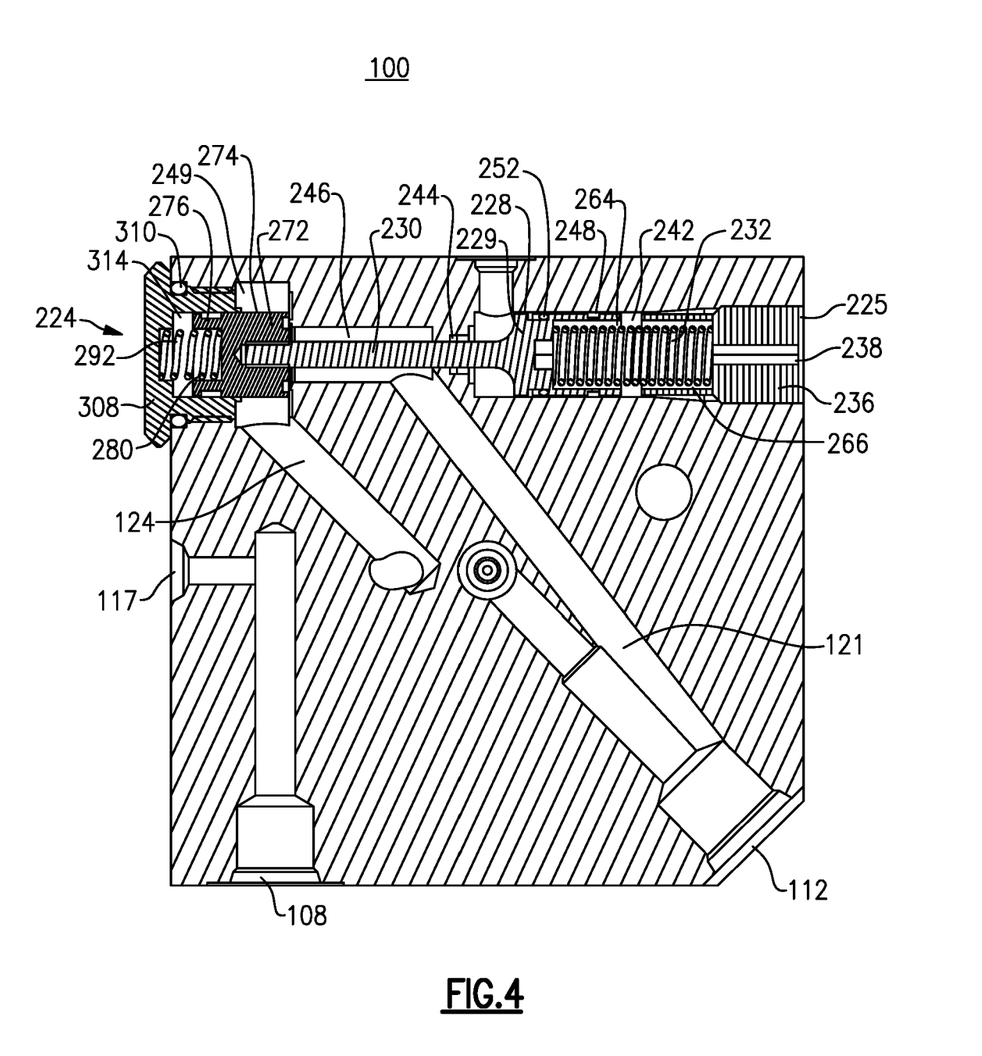
FIG. 4 is a side sectioned view of a portion of the flow regulator of FIGS. 1-3, depicting a mechanical bypass valve in relation to the inlet and outlet ports of the flow regulator.

A solenoid valve 116 is mounted onto an adjacent side of the housing 104, as well as an inlet pressure sensor 117, FIG. 4, that is fluidically connected to the inlet port 108. Additionally, a pressure release and relief valve (partially shown) is also disposed between the coolant ports 118, 122 and the inlet port 108. It will be readily apparent that the location of the specific ports and valves can be varied, provided the necessary functions can be carried out.

An adjustable weighting or loading mechanism is attached to the top surface of the regulator housing 104 including a bonnet 140, while a control element or feature (e.g., a balance valve) is disposed within the extending bottom portion of the housing 104. The housing 104 further retains a bypass valve 224. Each of these resident features will be further discussed in greater detail in a later portion of this description.

For purposes of use, the inlet port 108 is configured by means of a barb or other connection feature (not shown) to receive compressed natural gas (CNG) from an external source (not shown) through a hose, a pipe or the like. The outlet port 112 of the herein flow regulator 100 is similarly configured, for example, for connection to an engine (not shown) of a motorized vehicle (not shown). In addition, a set of mounting holes 126 are further provided to enable attachment of the flow regulator 100 to the engine.

Figure 2:
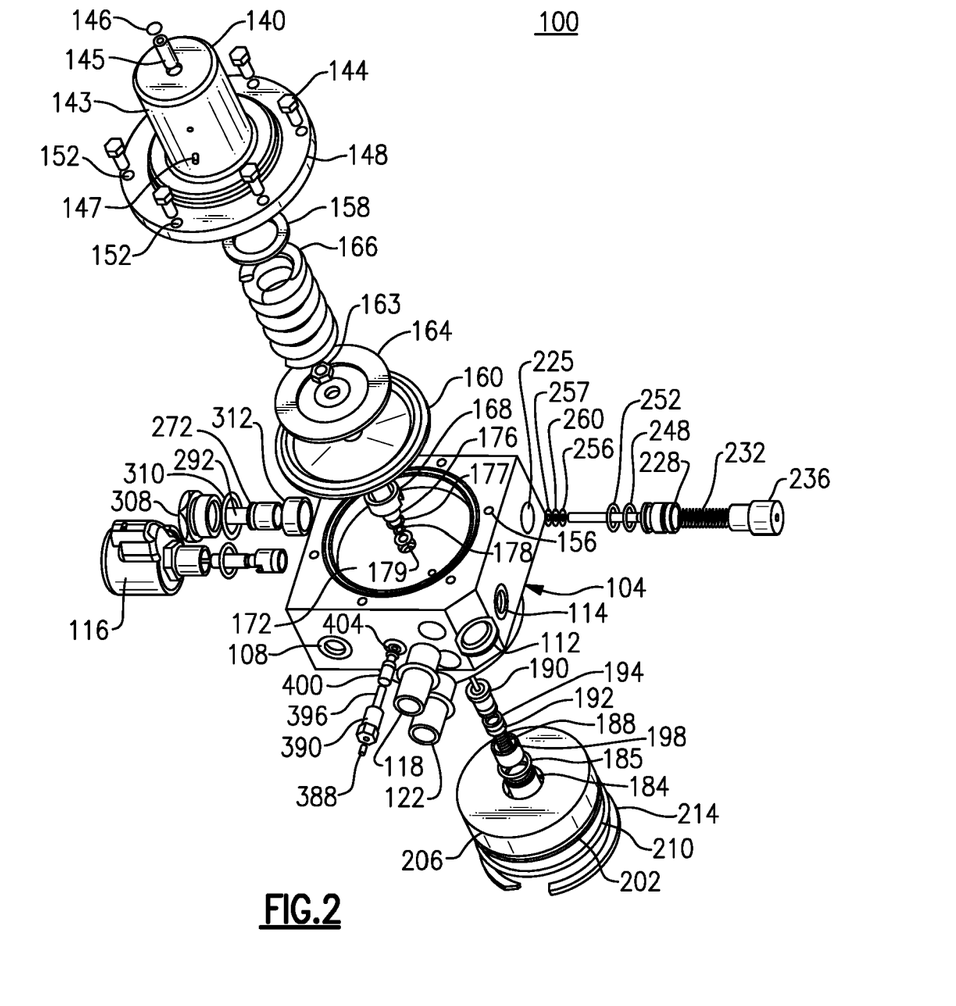
FIG. 2 is an exploded top perspective view of the flow regulator of FIG. 1.
Figure 7:
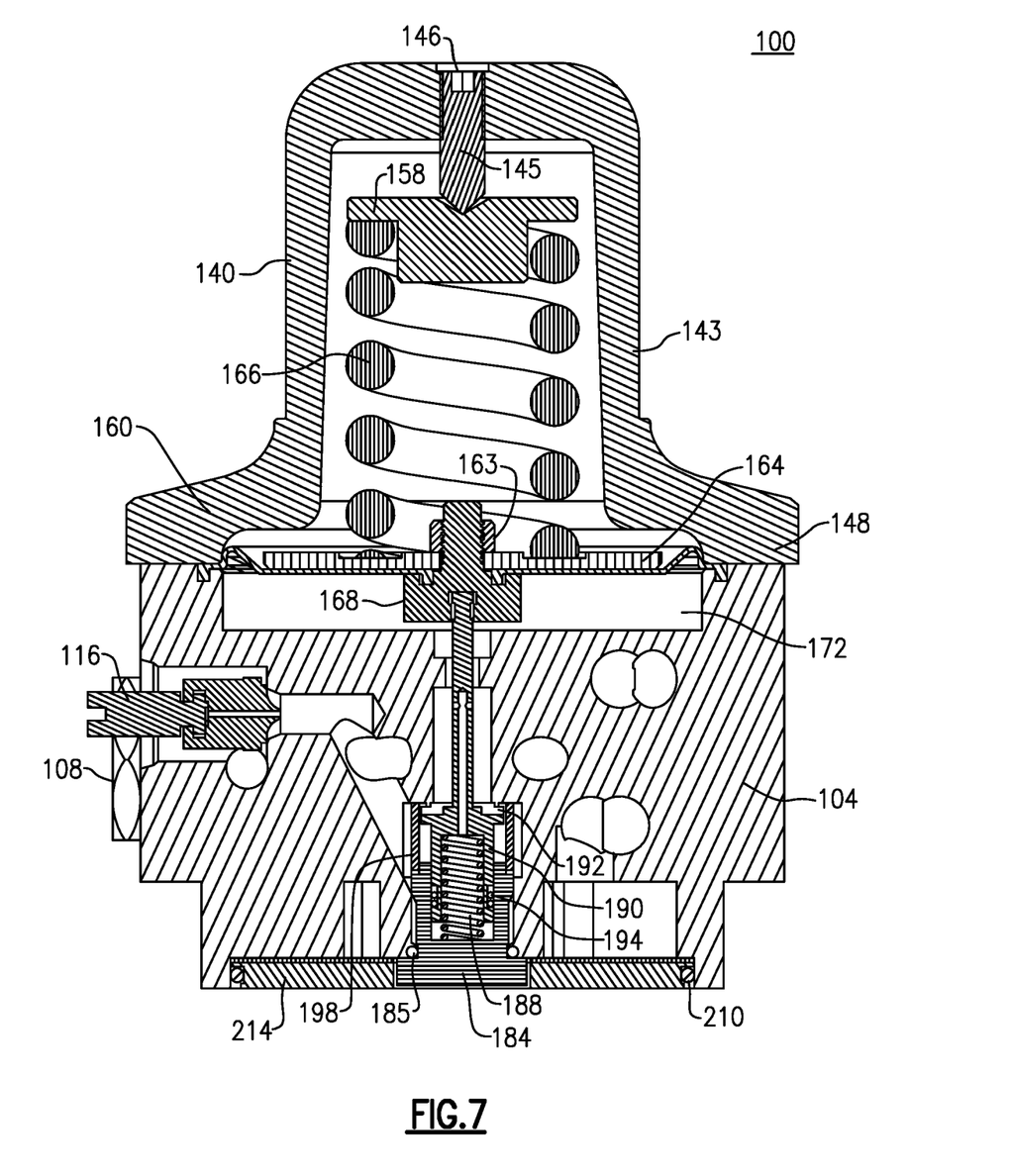
FIG. 7 is a side sectioned view of the flow regulator of FIGS. 1-6, further depicting a balance valve assembly in cooperation with the adjustable weighting or loading mechanism of the flow regulator.

An exploded view of the flow regulator 100 is shown in FIG. 2. With reference to FIGS. 2 and 7, and mounted to the top (as shown, according to the accompanying drawings) of the regulator housing 104 is the weighting or loading mechanism that includes the bonnet 140 mounted by means of a plurality of bonnet fasteners 144, such as bolts, screws or other suitable mounting components. The bonnet 140 is defined by an upper hollow cylindrical portion 143 and a lower circular plate 148 having a plurality of peripheral fastening holes 152 to enable the bonnet 140 to be secured to the top surface of the regulator housing 104. The top surface of the regulator housing 104 includes a set of aligned holes 156 relative to the fastening holes 152 of the bonnet 140 to permit securement.

The weighting or loading mechanism of the herein described regulator 100 is further defined by a diaphragm 160 having a diaphragm plate 164 disposed on a top surface of the diaphragm 160. The diaphragm 160 is made from a material that permits deflection. For example, elastomeric and metallic materials. One end of a load spring 166 is disposed in contact with the diaphragm plate 160 with the remaining end of the load spring 166 engaged with a spring button 158, each of the foregoing being housed within the hollow cylindrical portion 143 of the bonnet 140 when assembled. A set screw 145 is accessed from the top of the cylindrical portion 143 of the bonnet 140 through a threaded opening, including an expansion plug 146 at the distal end of the set screw 145 to enable adjustment of the tension of the load spring 166, as needed. A porous plug 147 is further disposed within an opening formed in the cylindrical portion 143 of the bonnet 14.

The diaphragm 160 is further disposed and supported by a diaphragm insert 168 that is seated along with the diaphragm 160 within a top or upper recessed portion 172 formed in the top surface of the regulator housing 104 along with a diaphragm seat nut 163, a plug guide 176, a pair of sealing elements 177, 178, and a washer 179, each disposed relative to an center opening formed in the upper recessed portion 172.

According to this embodiment and still referring to FIGS. 2 and 7, a balance valve 180 is further disposed within the regulator housing 104 and directly beneath the top recessed portion 172. According to this embodiment, the balance valve 180 includes a cap 184 retaining the valve 180 within the bottom extending portion of the regulator housing 104. The cap 184 includes a sealing member 185, such as an elastomeric O-ring, that is disposed between an external surface of the cap 184 and a through opening formed in the bottom extending portion of the regulator housing 104. The lower proximal portion of a valve plug 190 is retained within a distal end cavity of the cap 184, the valve plug 190 including an elongate distal portion 191 which extends through a defined passage formed in the regulator housing 104. The proximal portion of the valve plug 190 further includes a defined recess sized to accommodate a plug spring 188. One end of the plug spring 188 engages an inner surface of the defined recess of the proximal portion of the valve plug 190 and the remaining end of the plug spring engages an inner surface of the cavity of the cap 184. Sealing members are provided within an annular groove on the exterior of the proximal portion of the valve plug 190 for engaging the inner wall of the recess of the cap 184. The extending elongate distal end 191 is partially hollow and upwardly (as depicted) extends through the defined passage of the housing 104 for retention within a recess formed in the lower portion of the diaphragm insert 168.

The diaphragm insert 168 is retained against the bottom surface of the diaphragm 160, the insert 168 including a distal or upper portion that extends through aligned center openings formed in the diaphragm 160 and the diaphragm plate 164, the upper portion of the insert 168 being secured by the diaphragm seat nut 163.

The diaphragm 160 is retained within an annular groove of the diaphragm insert 168 at the center and the outer peripheral edge of the diaphragm 160 is fixedly secured, such that the movement of the valve body 190 is sensitive to movement of the diaphragm 160 based on changes to contained (outlet) pressure.

Additionally, the herein described regulator 100 includes a cooling plate 202 that is also disposed in the bottom extending portion of the regulator housing 104. A gasket 206 is disposed onto the top of the cooling plate 202 and relative to a snap ring 214 covering the bottom of the regulator housing 104, the snap ring 214 having a center opening that accommodates the cap 184. A sealing member 210, such as an elastomeric O-ring, is disposed between the cooling plate 202 and the snap ring 214.

With reference to FIG. 2, a bypass valve 224 is disposed within aligned openings 225, 226, the latter only shown in FIG. 4, formed in the regulator housing 104, the through openings 225, 226 being formed in opposite walls with a passage 240, FIG. 4, extending through the interior of the housing 104. The components and functionality of the bypass valve 224 will be discussed in greater detail in a later section of this description.

The high pressure solenoid shut-off valve 116 is disposed in relation along one of the side or lateral walls of the regulator housing 104. The solenoid valve 116 is defined as a subassembly that is linked fluidically to the outlet port 112 and the balance valve 180. Details relating to the functionality and design of the solenoid valve are well known and do not form a substantive part of this disclosure.

Figure 8:
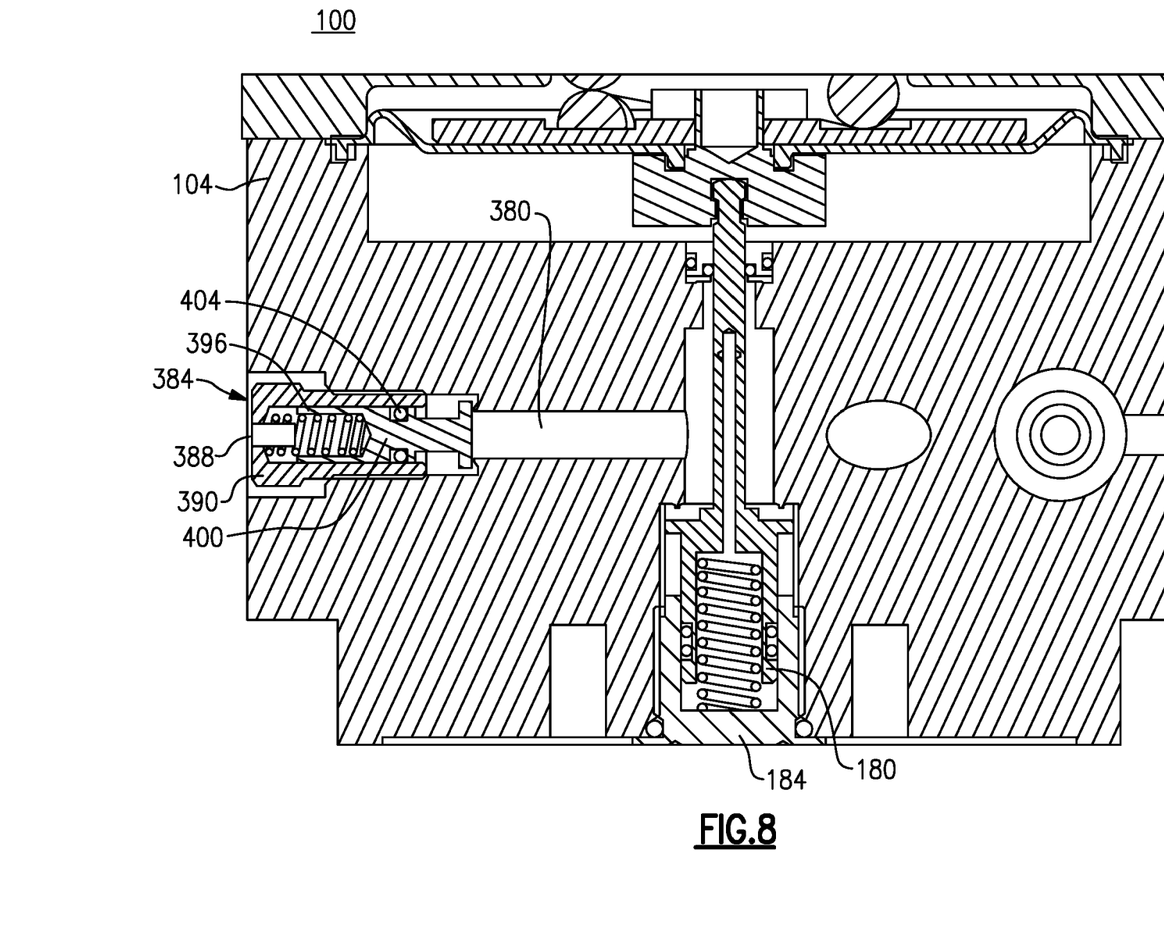
FIG. 8 is a side sectioned view of the flow regulator further depicting a pressure relief and release valve.

With reference to FIGS. 2 and 8, the pressure relief and release valve 384 includes a valve body 390 having a cavity that accommodates a valve spring 396, with one end of the valve spring 396 engaging an inner wall of the cavity of the valve body 390 and the opposing or distal end of the valve body 390 engaging a poppet 400. The poppet 400 includes a valve seat at one (distal) end that engages an opening of a defined capture pipe 380 having a diameter that is smaller than the valve seat, the capture pipe 380 extending through the interior of the regulator housing 104 between the balance valve 180 and the exterior of the housing 104. The valve body 390 is retained within a widened portion of the capture pipe 380, an intermediate portion of which engages a shoulder of the capture pipe 380. The pressure release and relief valve 384 is fixedly secured within the capture pipe 380 in which the only movable elements are the poppet 400 and valve spring 396. A sealing element 404 is provided within a defined groove of the poppet 400 for engaging the groove and an inner wall of the valve body 384. In operation, excess pressure is released, according to this embodiment, by gas which overcomes the preset tension of the valve spring to unseat the poppet 400 and allow gas to vent through the porous plug 388, the latter being disposed within a proximal opening of the valve body 384 and to atmosphere.

Figure 3:
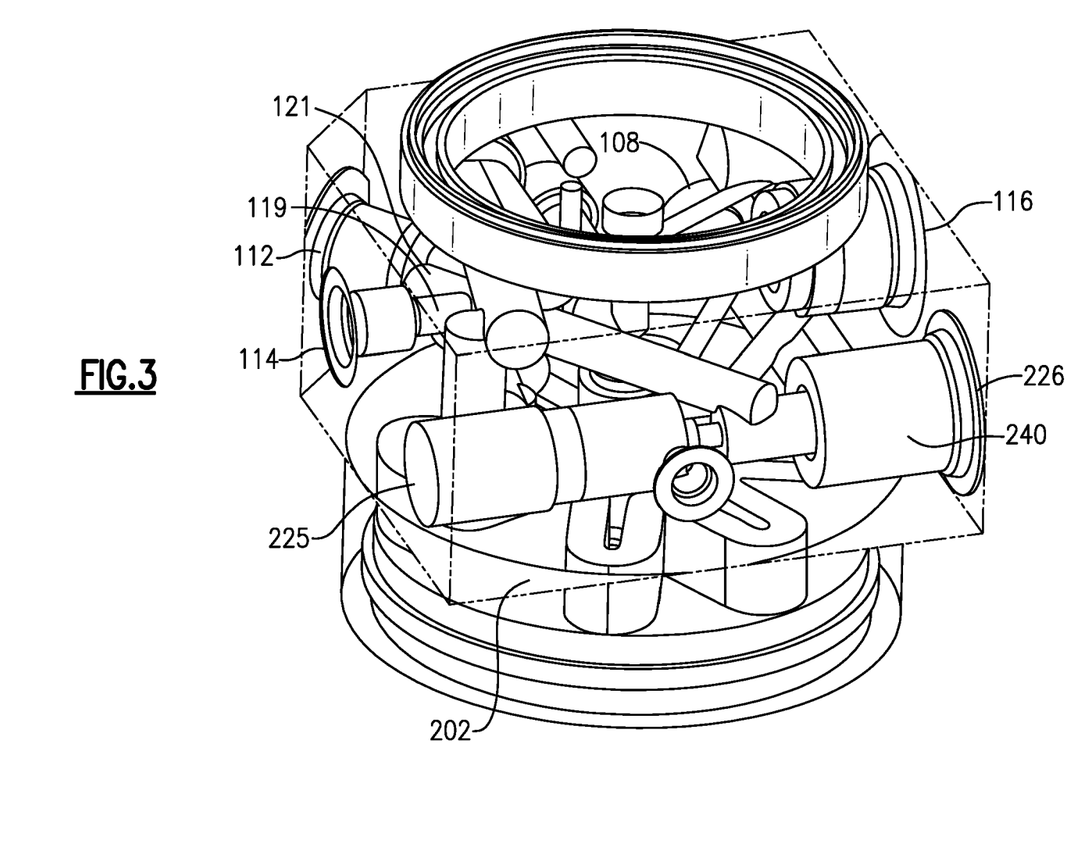
FIG. 3 is a partial view, shown in section, of the interior of the housing of the flow regulator of FIGS. 1 and 2, showing various defined passages.

As shown in the sectioned view of FIG. 3, the housing 104 is defined by a plurality of interior channels or passages, a number of which are sized and configured to retain a plurality of components, such as the bypass valve 224, as discussed herein, and a further number of which are configured for the passage of fluid (e.g., compressed natural gas). For example, the outlet pressure port 114 extends along a defined passage 119 that intersects an interior passage 121 extending from the outlet port 112.

Among the passages provided in the interior of the regulator housing 104 is a passage 240 extending between the through openings 225, 226 on opposite side walls of the regulator housing 104 that retains the bypass valve 224, FIG. 4. As discussed herein, this latter through passage 240 is defined by adjacent axial sections or portions 242, 244, 246, 249, 250, (each shown in FIG. 4) each axial section having a different diameter. In addition, each of the inlet port 108 and the outlet port 112 of the herein described regulator 100 are fluidically connected by defined passages 124, 121 to the bypass valve 224.

Referring to FIGS. 2-4, the bypass valve 224 is situated between the inlet port 108 and the outlet port 112 within the passage 240 wherein the inlet port 108 and outlet port 112 are each coupled fluidically to the bypass valve 224 via the respective channels or passages 124, 121, FIG. 3, formed in the regulator housing 104.

The bypass valve 224, according to this described embodiment, includes a sensing piston 228 that is operatively connected to a control spring 232. The sensing piston 228, which is fitted and axially movable within a defined axial portion 242 of the through passage 240, includes a pair of spaced grooves defined on an exterior surface of the sensing piston 228 that retain a guide ring 248 and a sealing element 252, respectively, for engaging an inner wall of the axial portion 242 of the defined through passage 240. In one version, the sealing element 252 can be an elastomeric O-ring.

One end of the control spring 232 is engaged within a recess 264 that is formed in the proximal end of the sensing piston 228. According to this embodiment, the remaining end of the control spring 232 is supported within a recess 266 that is defined in the distal end of the adjustment plug 236. The adjustment plug 236 is further defined by a center through opening 238 that accommodates a user accessible feature, such as a set screw (not shown) to allow the tension of the control spring 232 to be adjusted. The sensing piston 228 is defined by a piston body or head 229, as well as an extending portion 230 that projects axially through a narrowed portion 244, and the adjacent axial portion 246 of the defined through passage 240 and into fixed engagement with a valve plug 272, the latter having a distal cavity sized to accommodate the end of the extending portion 230. The narrowed portion 244 of the defined through passage 240 is provided with a sealing element 256, a back-up ring 257 and a rod retainer 260 disposed therebetween.

According to this embodiment, the valve plug 272 includes a distal end 274 that fixedly receives the axially extending end portion 230 of the sensing piston 228 in the defined cavity. The proximal end 278 of the valve plug 272 is fitted within a cavity 314 defined in a cap 308 that covers the opening 226.

The cap 308 includes an exterior groove 278 that receives a sealing member 310, such as an elastomeric O-ring, that engages the interior of the through passage 400, and more specifically the axial portion 250.

Referring to FIG. 4, the valve plug 272 is axially movable with the sensing piston 228 within the defined through passage 400 and more specifically within the axial sections 249, 250 and is biased by a compression spring 292. One end of the compression spring 292 is disposed within the proximal end 276 of the valve plug 272 and more specifically within a defined cavity formed in the proximal end. The opposing end of the compression spring 292 is retained within an inner recess that is formed within the cap 308. The cap 308 is retained within the axial portion 250 of the through passage 400, a distal end of the cap 308 engaging a shoulder separating the axial sections 250, 249 of the defined through passage 400 and in which the proximal end of the cap 308 is accessible through opening 226. An optional filter 312 (shown only in FIG. 2) is disposed between the interior of the cap 308 and the exterior of the valve plug 272.

As noted, the valve plug 272 is movable within the axial section 250 with the axial range of movement being limited by stop surfaces, namely an inner surface of the cap 308 and a shoulder separating the axial portions 249 and 246 of the defined through passage 400. The inlet passage 124 is fluidically connected with the defined through passage 400 of the bypass valve 224 and more specifically axial section 249 according to this embodiment. The outlet port 112 is fluidically connected via passage 124 with the adjacent axial section 246 of the defined through passage 400.

Generally and according to this embodiment, the herein described bypass valve assembly 224 uses the control spring 232 acting upon the movable sensing piston 228. Accordingly and when the inlet pressure falls below a calibrated and predetermined level or threshold, the spring load overcomes the weight of the sensing piston 228 and the valve plug 272 is displaced to an open position. As inlet pressure increases based on the flow of entering compressed gas, the piston load overcomes the bias of the control spring 232 and allows the sensing piston 228 and the valve plug 272 to move to a closed position. FIG. 4 depicts the bypass valve 224 in the closed position in which the passage of CNG is blocked by the presence of the valve plug 272, which prevents CNG from entering the through passage 400. It should be noted that this latter movement is gradual and does not require pressure reference of flow to the atmosphere in order to operate.

According to this embodiment, the control spring 232 can be adjusted or preloaded by means of the adjustment plug 236. The plug 236 includes an accessible feature that is preferably exterior of the regulator housing 104 to enable the proper spring tension to be placed on the sensing piston 228 to open the valve plug 272, allow the inlet pressure to bypass the regulator 100, and permit flow of compressed natural gas (CNG) directly to the outlet port 112. This adjustment allows the valve plug 272 with the assistance of the compression spring 292, to close when the supply/inlet pressure increases beyond the preset point of the control spring 232. As noted previously, an optional filter 312 for the herein described bypass valve 224 can be provided in the axial section 249 in order to filter the compressed natural gas prior to outputting same. According to at least one version, the filter 312 would be similar, if not identical, to the filter disposed when the compressed natural gas is flowing through the interior of the regulator housing 104 in the regulated mode of operation.

It should be noted that variations of the herein described bypass valve design are possible. For example, the valve plug can be alternatively defined by a cylindrical end portion extending from the body of the valve plug for engagement with the movable sensing piston.

With the following description and with reference to the figures, a porting sequence is described in which compressed gas from the fluid source (not shown) enters the inlet port 108 and is routed through the defined passage 124 to the bypass valve 224. As noted, the bypass valve 224 is initially biased in an open position in which the movable sensing piston 228 (and guide plug 272) are retained by the control spring 232. As a result, compressed natural gas enters the axial section 249 of the defined through passage 400 and is routed through adjacent axial section 246 and outlet channel 124 to the outlet port 112. As the entering compressed gas engages the sensing piston 228, the sensing piston 228 (and the guide plug 272) is caused to move axially and against the bias of the control spring 232. In the meantime, the flow regulator 100 utilizes the bypass mode of operation as a fail safe with the entering compressed gas passing to the outlet port 112 directly through the axial portions 249, 246 of the defined through passage 400 to the outlet port 112. In passing, it should be noted that the herein described bypass valve can be provided as a separate assembly or alternatively used in other applications. For example, the herein described bypass valve could be employed in a manifold.

When the inlet pressure is above the predetermined threshold (greater than the biasing force of the control spring 232), the bypass valve 224 is closed and CNG is no longer permitted to directly enter the through passage 400 for routing to the outlet port 112. As a result, the entering compressed gas can only pass into the flow regulator 100 against the weighting mechanism, including the spring loaded diaphragm 160 and the control feature, e.g., the balance valve 180 according to this embodiment.

Figure 5:
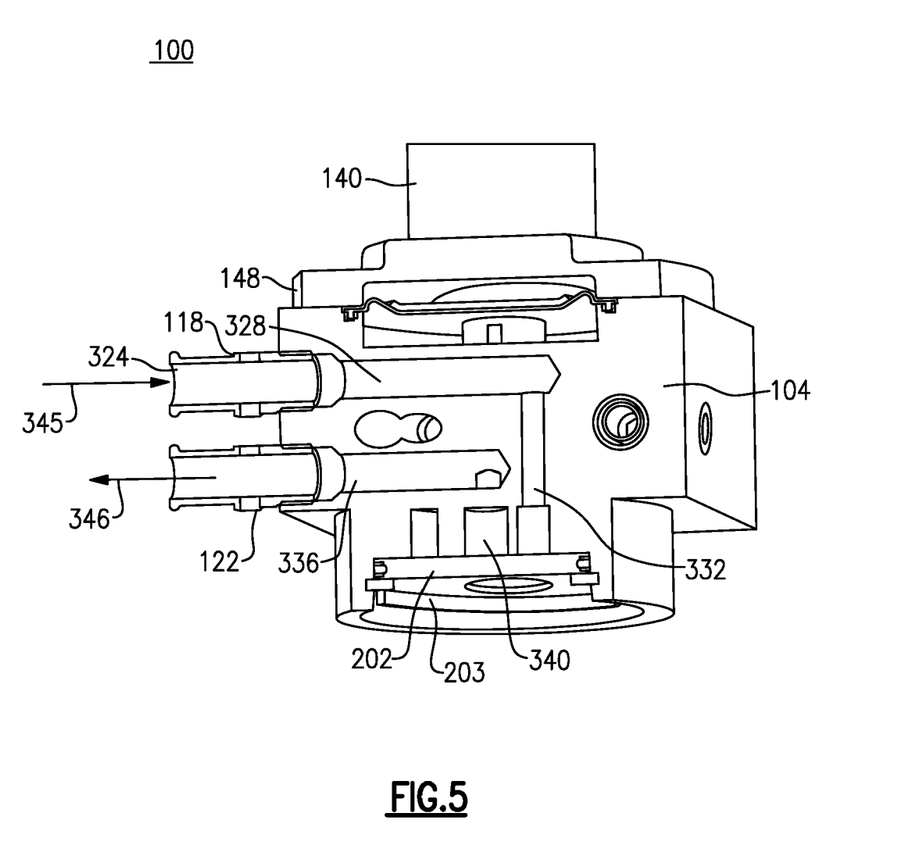
FIG. 5 is a side sectioned view of the flow regulator of FIGS. 1-4, including coolant connections for the flow regulator.
Figure 6:
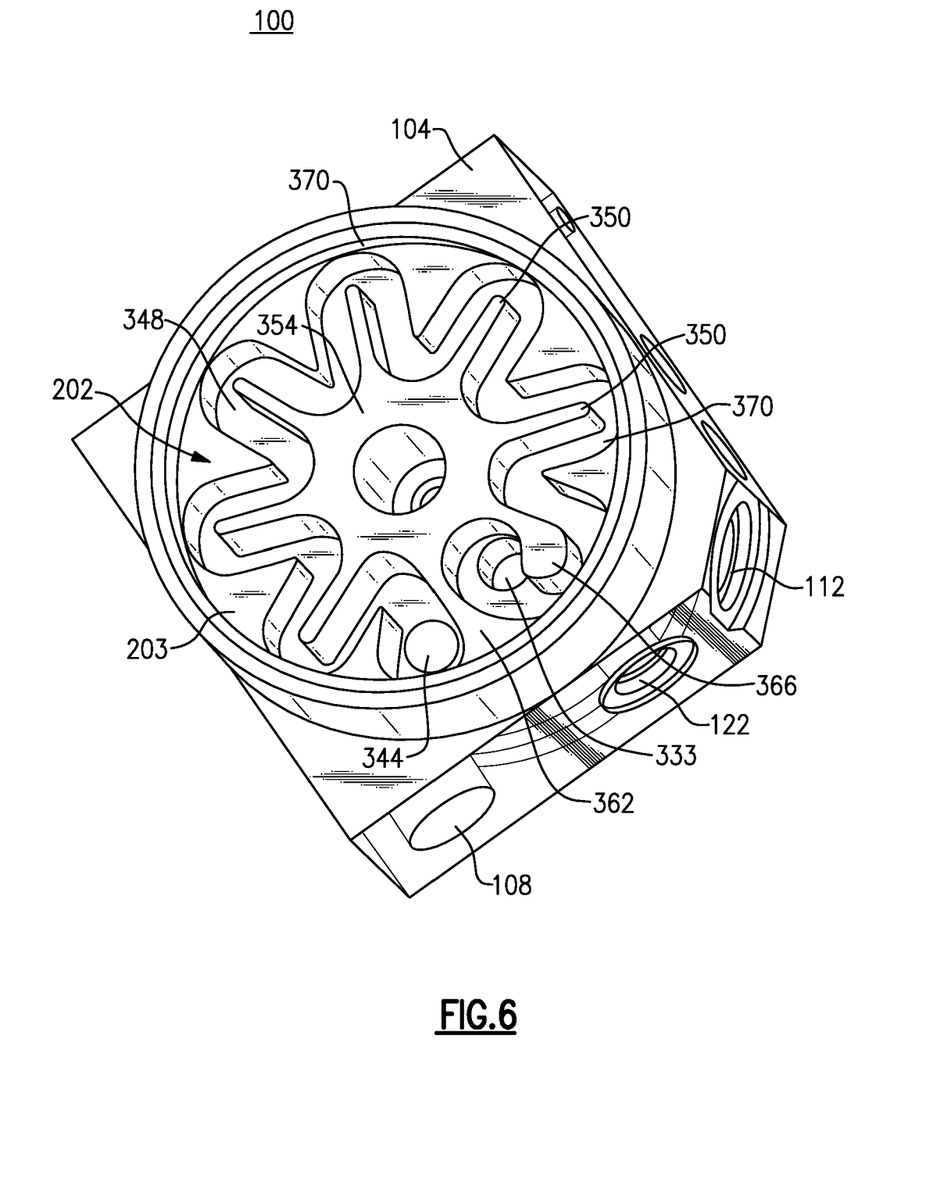
FIG. 6 is a bottom perspective view of the flow regulator of FIGS. 1-5.

Referring to FIGS. 5 and 6, and according to this described embodiment, the flow regulator 100 can be provided with a defined coolant circuit (also referred to herein as a "coolant bowl") to reduce the risk of heavier hydrocarbons and also for purposes of the Joule Thompson effect in order to further stabilize temperature within the housing 104. For the sake of clarity, similar parts are herein labeled with the same reference numerals. As previously discussed, a first coolant port 118 is provided in a lateral or side wall of the regulator housing 104. More specifically, the first coolant port 118 includes a barb 324 or other suitable connector that enables a hose (not shown) to be connected thereto from a source (not shown) of compressed natural gas (CNG). As shown most clearly in the sectioned view of FIG. 5, the first coolant port 118 is coupled to an axial passage 328 extending within the interior of the regulator housing 104. A connected passage 332 extends transversely (downwardly as shown in FIG. 5) from the interior end of the axially extending passage 328 and exits through an aligned opening 333, FIG. 6, formed in the lower or bottom surface 203 of the coolant plate 202.

The second coolant port 122 similarly includes a barb 324 or other connector linking same to the fluid source (not shown) through a hose or other form of connection. This coolant port 122 also includes an axially passage 336 extending through the interior of the regulator housing 104 and a transverse (downwardly according to this view) passage 340 (partially shown in this view) extending from the interior end of the axially extending passage 336. The transverse passage 340 terminates, according to this embodiment, through an aligned through opening 344, FIG. 6, provided in the coolant plate 202.

Linking the openings 333 and 344 of the coolant plate 202 and completing a loop or circuit is a defined serpentine track portion that is formed on the lower or bottom surface 203 of the coolant plate 202. According to this embodiment, coolant is input through the first input port 118 per arrow 345 and directed back to the coolant source (not shown) via arrow 346. The serpentine track portion according to this specific embodiment is defined by a recessed channel 348 that is formed by suitable machining to an appropriate depth into the lower surface 203 of the coolant plate 202. The depth of the recessed channel 348 can be varied over at least a portion of the defined track or can be made to be substantially constant. According to this embodiment, the recessed channel 348 is defined about an unmachined center portion 354 of the coolant plate 202. More specifically and as machined therein, a plurality of spokes 350 radially extend from the center portion 354 in an evenly spaced manner. According to this embodiment, a series of eight (8) spokes 350 are provided at spaced 45 degree increments. The majority (6) of the formed spokes 350 are identical and defined by a member that projects radially from the center portion 354 and terminates with a curved end extending a predetermined distance from the outer peripheral edge of the coolant plate 202. This predetermined distance defines the width of the recessed channel 348. The recessed channel 348 originates at the opening 333 and terminates at the opening 344. An unmachined portion of the coolant plate 202 forms a wall 362 between the openings 333 and 344 at one of the 45 degree increments. One side of the formed wall 362 adjacent the opening 333 is curved to essentially correspond to the shape of the opening 333. The opposite side of the formed wall 362 according to this embodiment is essentially planar. The remaining spoke 366 is curved in a manner that follows a portion of the outer edge of the opening 333. This latter spoke 362 is significantly thicker than the remaining defined spokes 350 wherein the serpentine track portion is defined by a plurality of circumferentially spaced C-shaped track sections 370 of substantially constant width formed about each of the spokes 350.

Entering coolant fluid from opening 333 is caused to move around the thickened spoke 366 along the defined passage 348 and about each of the spokes 350 in a back and forth manner in which fluid is caused to move both radially and circumferentially along the formed serpentine track portion. The coolant fluid is then directed from the passage through opening 344 and the output port via passages 340 and 336, respectively. As noted and according to this embodiment, the first and second coolant ports 118, 122 are formed in the same side wall of the regulator housing 104 with the first coolant port 118 being disposed directly above the second coolant port 122. It will be readily apparent, however, that other suitable configurations can be utilized.

As a result, coolant fluid (not shown) is directed in a loop or circuit in which fluid is input through the first coolant port 118 and passages 328, 332 through the opening 333 in the coolant plate 202. The fluid is then directed through the defined serpentine track portion along the machined channel 348 formed in the lower or bottom surface 203 of the coolant plate 202, providing uniform convective heat transfer for the regulator 100. The coolant fluid is then circulated through the opening 344 of the coolant plate 202 and passages 340, 336, respectively, to the second coolant port 122 and back to the fluid source (not shown).

In operation and while compressed natural gas is being directed through the interior of the housing in the regulated mode of operation, the reduction in pressure and volume of the gas produces corresponding rises in temperature. Therefore and to counteract the temperature increase of the compressed natural gas, coolant fluid is directed from the source (not shown), into the coupled first coolant port 118 and through the axial tubular passage to the transversely (downwardly) extending passage that extends to the serpentine track portion 336 on the coolant plate. Coolant fluid entering the track portion 336 is caused to move in a counterclockwise fashion about an extending curved spoke 341 and then in a serpentine fashion about each of the defined spokes 340 and along the defined recess/path to the exit opening. Coolant fluid is caused to exit upwardly to the tubular extension and then to the axial tubular passage and then through the second outlet port 122 and a hose (not shown) connected thereto. The serpentine pattern 340 formed creates a coolant bowl that effectively provides convective cooling of the entering natural gas under pressure into the herein described regulator 100.

PARTS LIST FOR FIGS. 1-8

- 100 regulator, flow
- 104 housing, regulator
- 108 inlet port
- 112 outlet port
- 114 port for outlet pressure sensor
- 116 solenoid valve
- 117 inlet pressure sensor
- 118 coolant port, first
- 119 passage
- 121 passage
- 122 coolant port, second
- 124 passage
- 126 mounting holes
- 140 bonnet
- 143 cylindrical portion, upper
- 144 bonnet fasteners
- 145 set screw
- 146 welsh expansion plug
- 147 porous plug
- 148 plate, lower
- 152 fastening holes, peripheral
- 156 aligned holes
- 158 spring button
- 160 diaphragm
- 163 diaphragm seat nut
- 164 diaphragm plate
- 166 load spring
- 168 diaphragm, insert
- 172 top or upper recessed portion, regulator housing
- 176 plug, guide
- 177 sealing element
- 178 sealing element
- 179 washer
- 180 valve, balance
- 184 cap
- 185 sealing member, cap
- 188 plug spring
- 190 valve, plug
- 191 elongate distal portion, valve plug
- 192 back-up ring
- 194 sealing element
- 198 filter, regulator
- 202 coolant plate
- 203 bottom or lower surface, coolant plate
- 206 gasket, coolant plate
- 210 sealing member
- 214 snap ring
- 224 bypass valve
- 225 opening
- 226 opening
- 228 piston, sensing
- 229 piston body
- 230 extending end, piston
- 232 control spring
- 236 adjustment plug
- 238 through opening, adjustment plug
- 240 passage, through
- 242 axial portion, passage
- 244 axial portion, passage
- 246 axial portion, passage
- 248 guide ring
- 249 axial portion, passage
- 250 axial portion, passage
- 252 sealing element
- 256 sealing member
- 257 back up ring
- 260 retainer, piston rod
- 264 recess, sensing piston
- 266 recess, adjustment plug
- 272 valve plug
- 274 distal end, valve plug
- 276 proximal end, valve plug
- 280 recess, proximal end of valve plug
- 292 compression spring
- 308 cap
- 310 sealing member, cap
- 312 filter
- 314 cavity, cap
- 324 barb
- 328 axial extending passage
- 332 transverse extending passage
- 333 opening, coolant plate
- 336 axial passage
- 340 transverse extending passage
- 344 opening, coolant plate
- 344 center portion
- 345 arrow
- 346 arrow
- 348 recessed channel
- 350 spokes, radially extending
- 354 center portion
- 362 wall
- 366 spoke, thickened curved
- 370 c-shaped track sections
- 380 capture pipe (pressure relief)
- 384 pressure release and relief valve
- 388 porous plug
- 390 housing, valve
- 396 valve spring
- 400 poppet
- 404 sealing member, pressure release and relief valve It will be readily apparent that numerous modifications and variations can be made based upon the inventive concepts that are described herein, including the following appended claims of this application.

The invention claimed is:

1. A flow regulator for a compressed natural gas (CNG) system, the regulator comprising:
a housing comprising a gas inlet port, a gas outlet port, a first coolant port, a second coolant port and an interior; and
a coolant plate disposed within the interior of the housing, said coolant plate including a plurality of circumferentially spaced spokes symmetrically disposed about the center of the coolant plate and a recessed channel formed about the spokes in a serpentine pattern in which opposing ends of the recessed channel are fluidically connected to the first and second coolant port, respectively, and through which a cooling fluid is directed to control the temperature of CNG separately flowing through the housing between the gas inlet port and the gas outlet port.

2. The flow regulator as recited in claim 1, in which the first and second coolant ports are adapted for connection to a source of cooling fluid.

3. The flow regulator as recited in claim 2, in which the recessed channel has a first opening fluidically connected to the first coolant port and a second opening fluidically connected to the second coolant port, the first and second openings being formed at the opposite ends of the recessed channel.

4. The flow regulator as recited in claim 1, in which the first opening and second openings are formed through the coolant plate.

5. A method for manufacturing a flow regulator for a compressed natural gas (CNG) system comprising:
   providing a flow regulator housing having a gas inlet port, a gas outlet port, and an interior through which compressed natural gas flows; and
   providing a cooling circuit including a coolant plate within the housing interior, a first coolant port, and a second coolant port formed in the housing, the coolant plate having a recessed channel formed in a surface of the coolant plate through which a cooling fluid circulates to control the temperature of the CNG flowing separate from the cooling fluid between the gas inlet port and gas outlet port, the coolant plate including a plurality of spokes circumferentially and symmetrically disposed about the center of the coolant plate, and in which the recessed channel is formed about the plurality of spokes to define a serpentine pattern, the recessed channel having opposing ends fluidically connected to the first and second coolant ports, respectively.

6. The method as recited in claim 5, in which the first and second coolant ports are adapted for connection to a source of cooling fluid.

7. The method as recited in claim 6, in which the recessed channel includes a first opening connected to the first coolant port and a second opening connected to the second coolant port, the first and second openings being formed on the opposing ends of the channel.

8. The method as recited in claim 7, in which the first and second openings are formed through the coolant plate.

9. The cooling circuit as recited in claim 8, in which the recessed channel has a first opening and a second opening at the opposing ends of the channel, the first opening being fluidically connected to the first coolant port and the second opening being fluidically connected to the second coolant port.

10. The cooling circuit as recited in claim 9, in which each of the first and second coolant ports are adapted for connection to a source of coolant fluid.

11. The cooling circuit as recited in claim 9, in which the first and second openings are formed in the coolant plate.

12. A cooling circuit for a flow regulator of a compressed natural gas (CNG) system, the flow regulator comprising a housing having a gas inlet port, a gas outlet port and an interior, the cooling circuit comprising:
   a coolant plate sized and configured for placement within the interior of the housing,
   a first coolant port, and
   a second coolant port, each of the first and second coolant ports being formed in the housing, the coolant plate having a recessed channel formed in a surface of the coolant plate through which a cooling fluid circulates to control the temperature of CNG separately flowing through the housing between the gas inlet port and the gas outlet port, wherein the coolant plate includes a plurality of spokes circumferentially and symmetrically spaced about the center of the coolant plate, in which the recessed channel is formed about the plurality of spokes to form a serpentine pattern, the recessed channel having opposing ends fluidically connected to the first and second coolant ports, respectively.

13. The cooling circuit as recited in claim 12, in which the serpentine pattern is symmetric about the center of the cooling coolant plate.

* * * * *